United States Patent
Albert et al.

(12)

(10) Patent No.: US 8,752,808 B2
(45) Date of Patent: Jun. 17, 2014

(54) MOVEMENT TRANSFORMATION DEVICE AND VALVE COMPRISING SUCH A DEVICE

(75) Inventors: Laurent Albert, Verderie (FR); Gabriel Ridolfi, Hacqueville (FR)

(73) Assignee: Valeo Systemes de Controle Moteur, Cergy Pontoise Cedex (FR)

(*) Notice: Subject to any disclaimer, the term of this patent is extended or adjusted under 35 U.S.C. 154(b) by 297 days.

(21) Appl. No.: 13/378,373

(22) PCT Filed: Jun. 17, 2010

(86) PCT No.: PCT/EP2010/058547
§ 371 (c)(1),
(2), (4) Date: Feb. 20, 2012

(87) PCT Pub. No.: WO2010/146120
PCT Pub. Date: Dec. 23, 2010

(65) Prior Publication Data
US 2012/0138831 A1    Jun. 7, 2012

(30) Foreign Application Priority Data

Jun. 17, 2009    (FR) .................................... 09 02946

(51) Int. Cl.
*F16K 31/524*    (2006.01)
(52) U.S. Cl.
USPC .......... 251/229; 251/250.5; 251/252; 251/258
(58) Field of Classification Search
USPC ................. 251/248, 250.5, 229, 251–252; 251/257–261; 74/55–57
See application file for complete search history.

(56) References Cited

U.S. PATENT DOCUMENTS

| | | | | |
|---|---|---|---|---|
| 3,492,880 A * | 2/1970 | Pearson | ........................... | 251/58 |
| 4,338,961 A * | 7/1982 | Karpenko | ...................... | 251/229 |
| 4,651,969 A * | 3/1987 | Dowdall | ........................ | 251/252 |
| 5,269,492 A * | 12/1993 | McLennan | .................... | 251/229 |
| 6,007,047 A * | 12/1999 | Phipps | .......................... | 251/252 |
| 2004/0069285 A1 | 4/2004 | Telep et al. | | |
| 2006/0237675 A1* | 10/2006 | Telep et al. | ............. | 251/129.11 |
| 2008/0251147 A1* | 10/2008 | Hara | .............................. | 251/251 |
| 2009/0057596 A1* | 3/2009 | Coleman et al. | ............... | 251/251 |

FOREIGN PATENT DOCUMENTS

| | | |
|---|---|---|
| EP | 1 503 181 A1 | 2/2005 |
| FR | 2 914 975 A1 | 10/2008 |
| FR | 2914975 | * 10/2008 |
| WO | 2005/021954 A1 | 3/2005 |

OTHER PUBLICATIONS

International Search Report w/translation from PCT/EP2010/058547 dated Aug. 2, 2010 (4 pages).

* cited by examiner

*Primary Examiner* — John Bastianelli
(74) *Attorney, Agent, or Firm* — Osha Liang LLP

(57) ABSTRACT

The invention relates to A device for transforming a rotation of a gear into a translation of a slide, the device including a supporting member provided with a fixed tubular wall translatably connected to the slide by a cam channel, the gear being rotatably mounted on the supporting member and rotatably connected to the slide which is suitable for pivoting about an axis. The gear comprises a ring rotatably mounted on the tubular wall of the supporting member.

16 Claims, 3 Drawing Sheets

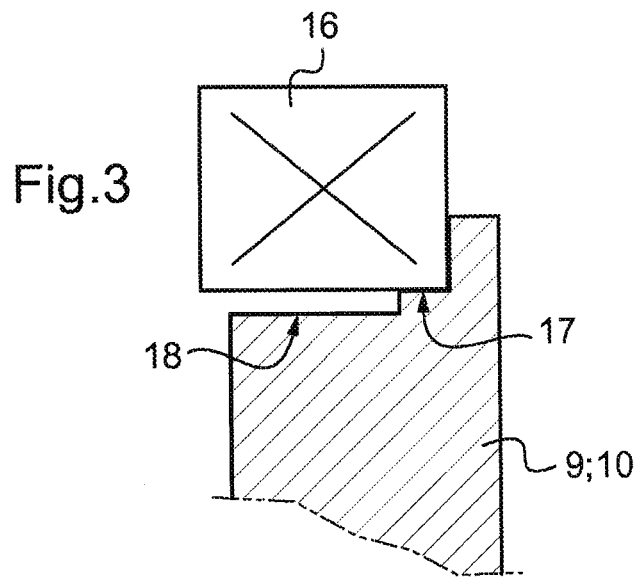
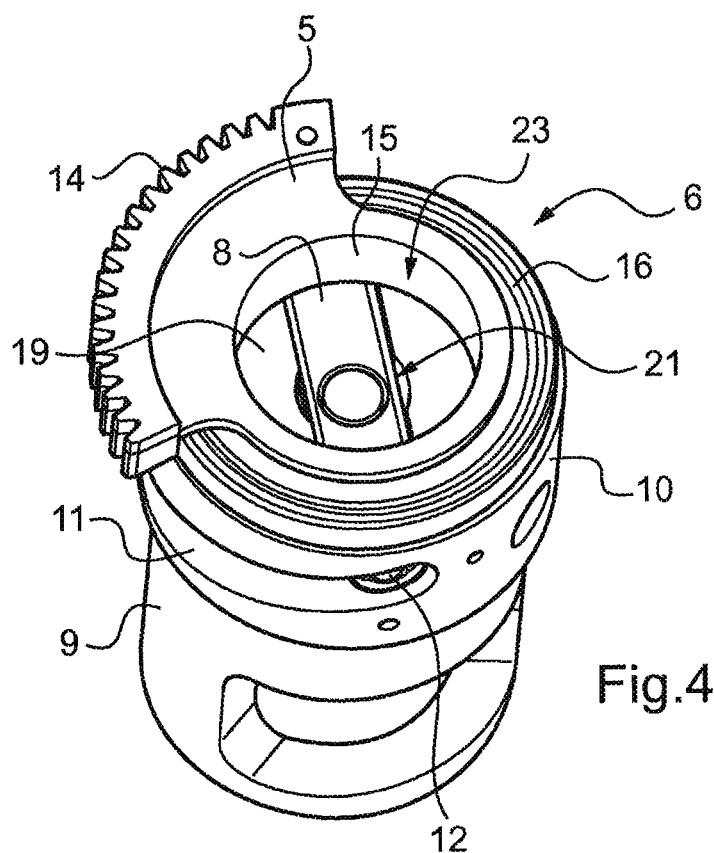

MOVEMENT TRANSFORMATION DEVICE AND VALVE COMPRISING SUCH A DEVICE

The invention relates to a device for converting a rotational movement of a gearwheel into a translational movement of a slide and to a valve comprising such a device. A valve of this type can for example be used in a motor vehicle combustion engine exhaust gas recirculation circuit.

BACKGROUND OF THE INVENTION

Document FR 2 914 975 describes such a movement conversion device and the application thereof to an EGR valve. Exhaust gas recirculation systems are known by their abbreviation EGR systems and are used for reinjecting exhaust gases into the intake side of a combustion engine notably with a view to reducing pollutant emissions.

OBJECT OF THE INVENTION

It is an object of the invention to reduce the cost and size of such a device.

BRIEF DESCRIPTION OF THE INVENTION

To this end, the invention has conceived of a device for converting a rotational movement of a gearwheel into a translational movement of a slide, the device comprising a support member equipped with a fixed tubular wall translationally connected to the slide by a camway, the gearwheel being mounted so that it can rotate on the support member and being connected in rotation to the slide which is able to pivot about an axis, characterized in that the gearwheel comprises a ring mounted to rotate on the tubular wall of the support member.

In such a conversion device, the gearwheel is positioned directly on the tubular wall and this guarantees that these two elements are suitably coaxial with one another. There is therefore no need to cap the support member with a pivot, and this makes the device more compact and simpler to produce. The support member may thus comprise a simple cylinder which acts as a tubular wall.

The gearwheel may have a central opening providing access to the slide.

Such a central opening can house components more compactly within the device. For example, a position sensor, whether this be a rotary or a linear sensor, can be housed in the central opening without increasing the size on the top of the support member.

The device may further comprise the following features, alone or in combination:
- the central opening may provide access to a portion of the slide which portion lies along the axis of pivoting thereof;
- the gearwheel may comprise a housing for the rotational drive of the slide;
- the drive housing may be defined by two longitudinal walls running parallel to the direction of translational movement of the slide;
- the gearwheel may comprise a skirt in the continuation of the ring, the longitudinal walls being attached to the skirt;
- the ring may be mounted to rotate on the tubular wall via a rolling bearing;
- the tubular wall may comprise a counterbore in which to mount the rolling bearing;
- the ring and the gearwheel may be coaxial.

Another subject of the invention targets a valve comprising a rotary actuator and a valve shutter which are joined together by a movement conversion device such that the actuator is able to close and open the valve shutter, the movement conversion device being as described hereinabove and the valve shutter forming part of the slide.

The valve may comprise the following features, alone or in combination:
- the central opening may provide access to a portion of the slide which portion lies along the axis along which the stem of the valve shutter extends;
- the slide may comprise a valve shutter and a bar fixed transversely to the stem of the valve shutter;
- the stem of the valve shutter may be fixed in a through-hole in the bar, the gearwheel may comprise a central opening providing direct access to the stem of the valve shutter;
- it may comprise a sensor that senses the position of the valve shutter and is arranged in the central opening;
- it may also comprise a protective cap, the sensor being mounted on the interior face of the cap.

BRIEF DESCRIPTION OF THE DRAWINGS

The invention will be better understood in the light of the description which follows of one preferred and nonlimiting embodiment, which description is given with reference to the attached drawings, among which:

FIG. 3 is a cross sectioned detail of FIG. 2;

FIG. 4 is a view of the device of FIG. 2, from above;

DETAILED DESCRIPTION OF THE INVENTION

Figure 1:
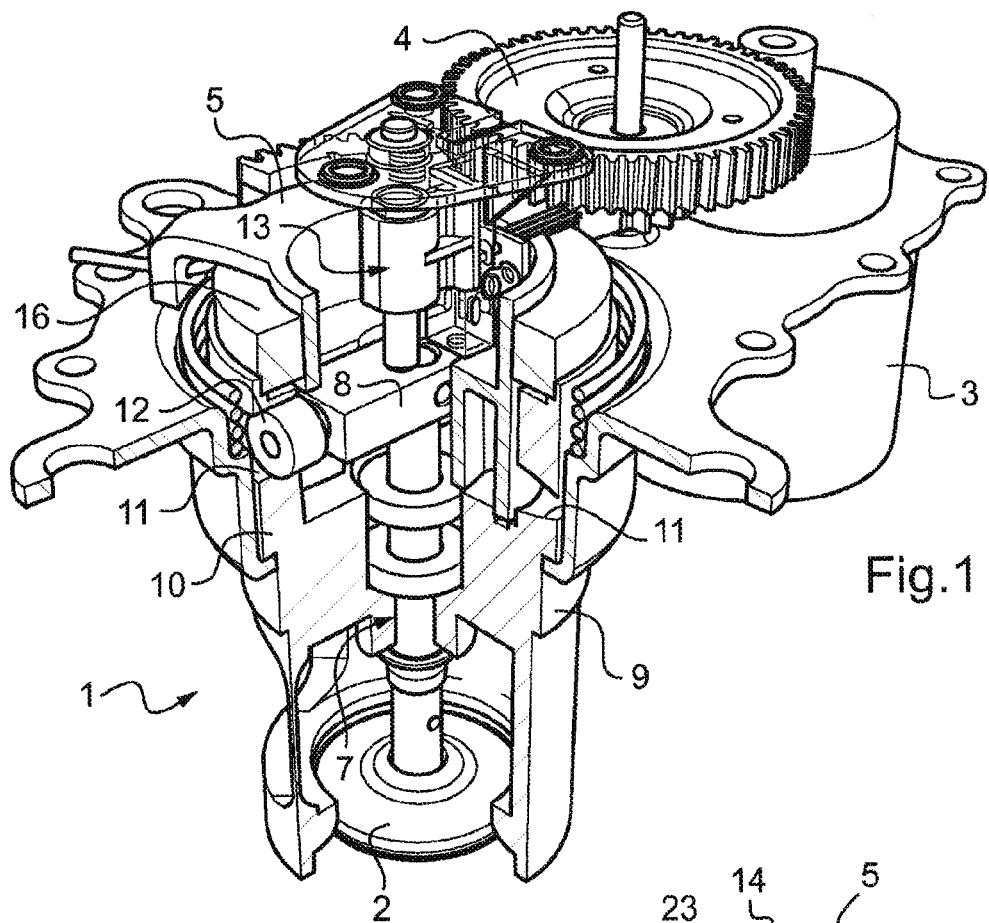
FIG. 1 is a perspective depiction of a valve comprising a movement conversion device according to the invention, this device being depicted in part section.

FIG. 1 depicts a valve 1 which, in this example, is an exhaust gas recirculation valve that works in the conventional way. The valve 1 comprises a valve shutter 2 which allows a fluid, in this instance the exhaust gases, to be introduced and metered into a line, in this instance the intake line.

Such a valve 1 comprises a motor 3 in mesh with a transmission wheel 4 which is itself in mesh with a gearwheel 5. The motor 3 is thus able to drive the rotation of the gearwheel 5. The rotational movement of this gearwheel 5 is moreover converted into a translational movement of the valve shutter 2 by a movement conversion device 6. The device 6 for this purpose comprises a support member 9 fitted with bearings 7 for longitudinally guiding the stem of the valve shutter 2. The support member 9 comprises a tubular wall 10 equipped with a camway 11 with which there collaborates a bar 8 fixed to the end of the stem of the valve shutter 2 (by pinning, force-fitting, welding or any other means of attachment). The camway 11 here is formed of two tracks one on each side of the tubular wall 10 (see FIG. 2), it being understood that it could comprise any suitable number thereof. It could thus have just one track or a number of tracks higher than two.

This bar 8 is fitted at each of its ends with a follower 12 collaborating with the camway 11 so that as the gearwheel is turned it in turn turns the bar 8 thus causing the translational movement of the valve shutter 2 because of the follower 12 running in the camway 11.

The valve shutter 2 and the bar 8 are fixed relative to one another and together form a slide the translational movement of which responds to the rotational movement of the gearwheel 5. Any other elements that might be rigidly connected to the valve shutter 2 would also form part of the slide.

The valve 1 additionally comprises a linear sensor 13 for determining the longitudinal position of the valve shutter 2.

Figure 2:
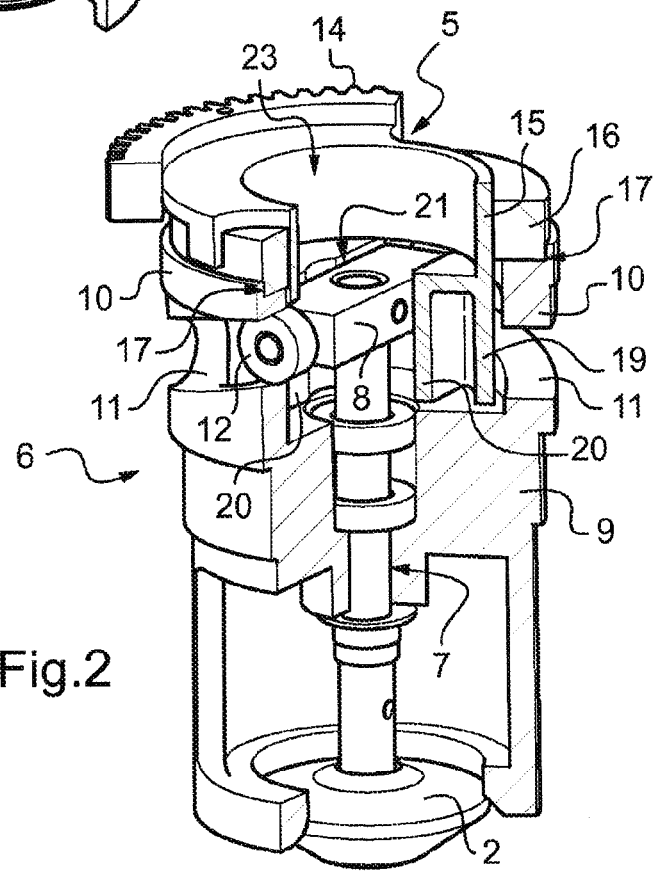
FIG. 2 is a perspective view in part section of the movement conversion device of FIG. 1.

FIG. 2 shows the support member 9 in isolation from the valve 1.

The gearwheel 5 comprises a toothed portion 14 able to mesh with the transmission wheel 4. In the present example, this toothed portion extends only over an angular sector that corresponds to the required linear travel of the valve shutter 2. The toothed portion could of course extend over a different angular sector, or even over the entire periphery of the gearwheel if necessary, depending on the operational range in which the slide 2, 8 is intended to operate.

The gearwheel 5 also comprises a ring 15 which extends in the direction of the axis of rotation of the gearwheel 5 so that this ring 15 forms a tubular mounting portion. The ring 15 is coaxial with the axis of rotation of the gearwheel 5. The gearwheel 5 is mounted to rotate on the support member 9 by fitting the ring 15 onto the internal ring of a rolling bearing 16 the external ring of which is itself snugly fitted onto the tubular wall 10 of the support member 9. The rolling bearing 16 is schematically depicted in the figures.

More specifically, in this example, the tubular wall 10 comprises a counterbore 17 into which the rolling bearing 16 is fitted. The optimum profile for the connection between the tubular wall 10 and the rolling bearing 16 is depicted, for this example, in the cross-sectional view that is FIG. 3. The counterbore 17 supports the outer ring of the rolling bearing 16 while a clearance 18 separates the tubular wall 10 from the remainder of the rolling bearing 16 to avoid unwanted friction.

The gearwheel 5 is thus mounted to rotate on the tubular wall 10 via the rolling bearing 16 so that rotation of the toothed portion 14 is coaxial with the direction of translational movement of the valve shutter 2. As an alternative, the rolling bearing 16 may be replaced by some other type of pivot connection, a plain bearing or a low-friction ring, for example. The ring 15 of the gearwheel 5 may also be mounted directly on the tubular wall 10 if the materials used, possibly with a surface treatment or coating where appropriate, have a suitable coefficient of friction.

The ring 15 of the gearwheel 5 is extended by a skirt 19 designed to collaborate with the bar 8. This skirt 19 comprises two mutually parallel longitudinal walls 20 running parallel to the direction of translational movement of the valve shutter 2. The two longitudinal surfaces 20 between them define a housing 21 for the bar 8 (see FIG. 4). Thus the bar 8 is positioned in the housing 21 so that the gearwheel 5 is able to turn the bar 8 via the longitudinal walls 20 and so that the bar 8 is free to slide in the housing 21 in the direction of translational movement of the valve shutter 2.

In consequence, within the valve 1, the rotation of the gearwheel 5 causes the turning of the bar 8, the followers 12 of which then roll along the fixed camway 11 (because the support member 9 is fixed in relation to the gearwheel 5 and to the slide 2, 8), and this jointly leads to the translational movement of the slide 2, 8 in the direction of opening or closing the valve shutter 2.

The gearwheel 5 also comprises a central opening 23 providing access to the slide 2, 8. The internal volume of the ring 15 in this instance is hollow and is thus put to use to form an empty space in which additional components of benefit to the operation of the valve 1 can be installed. In addition, this empty space provides access to the slide 2, 8 from above, so that components designed for example to collaborate with the stem of the valve shutter 2 or the bar 8 can be installed therein.

Figure 5:
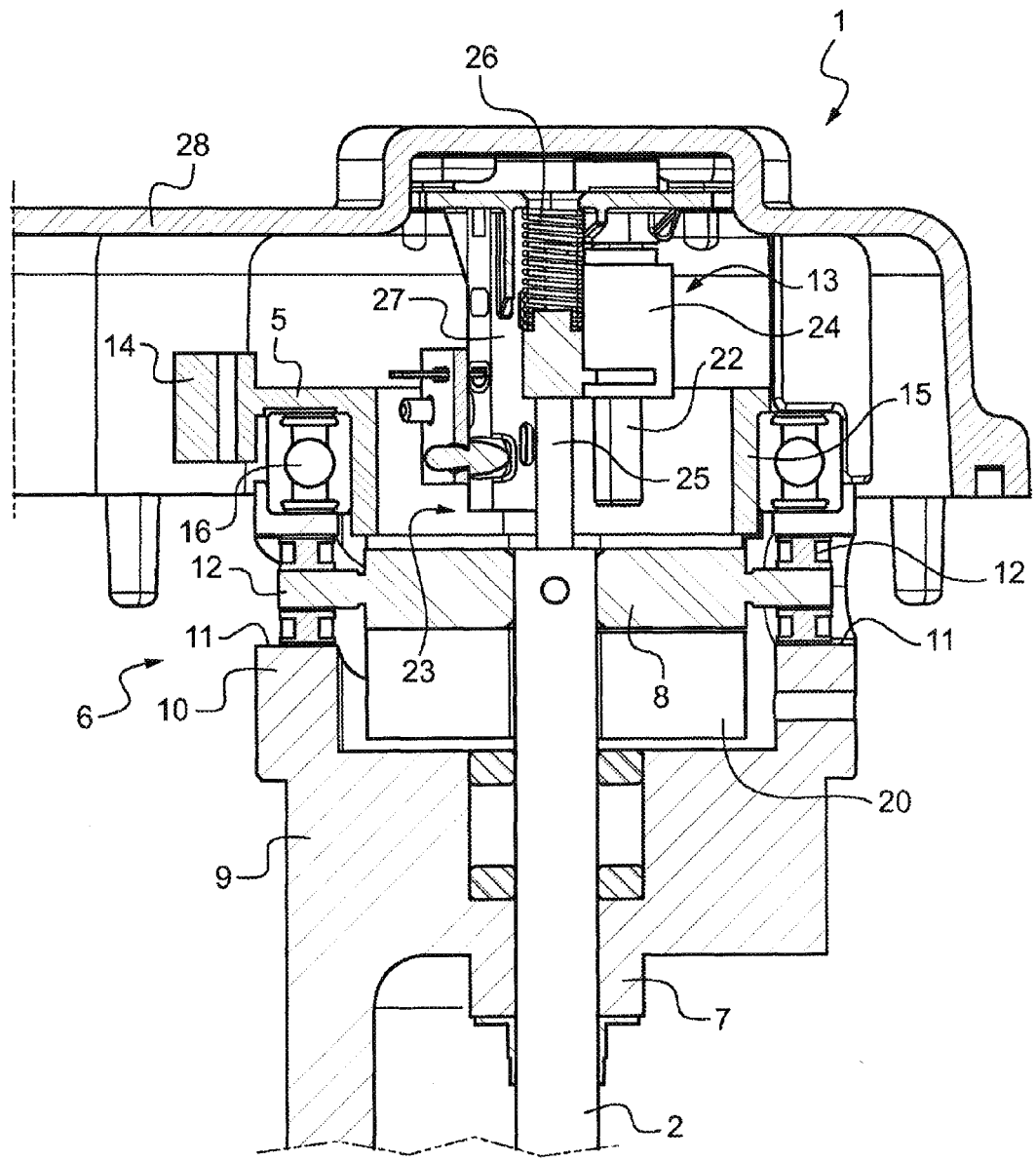
FIG. 5 is a sectional part view of the valve of FIG. 1, capped with a cap.

In the present example, this empty space is put to use for installing a sensor 13. With reference to FIGS. 1 and 5, the valve 1 indeed comprises a position sensor 13 that senses the translational position of the valve shutter 2. The position of the slide 2, 8 (of which in this instance the valve shutter 2 forms a part) is, in this example, registered by a conventional linear position sensor. An example of a linear position sensor is given in document EP1503181. Any type of sensor capable of registering the position of the slide 2, 8 can be used. The sensor 13 in this example comprises a guide rod 22 on which there slides a cylinder 24 which is attached to a feeler 25 kept in contact with the valve shutter stem by a spring 26. The feeler 25 follows the back and forth movements of the valve shutter 2 while a measurement device 27, generally comprising a Hall-effect probe (see document EP1503181) supplies a signal indicative of the linear position of the feeler 15 and therefore of the valve shutter 2. The measurement device 27, the guide rod 22 (with the elements attached to it) are fixed under the cap 28 which is depicted in FIG. 5 and which incidentally also protects the various components of the valve 1. Thanks to the housing 21, such a sensor 13 can be fitted without any appreciable increase in the size of the valve.

Alternative forms of embodiment of the invention can be conceivable of without departing from the scope of the invention. In particular, the longitudinal walls 20 may have an alternative shape; they may be produced in any form that allows the bar 8 to be turned as the gearwheel 5 is turned.

The invention claimed is:

1. A device for converting a rotational movement of a gearwheel into a translational movement of a slide, the device comprising:
    a support member equipped with a fixed tubular wall translationally connected to the slide by a camway, the gearwheel being mounted so that the gearwheel rotates on the support member, and wherein the gear wheel is connected in rotation to the slide which is able to pivot about an axis,
    wherein the gearwheel comprises a ring mounted to rotate on the support member by fitting the ring onto an internal ring of a rolling bearing, wherein an external ring of the rolling bearing is snugly fitted onto the tubular wall of the support member.

2. The device as claimed in claim 1, wherein the gearwheel has a central opening providing access to the slide.

3. The device as claimed in claim 2, wherein the central opening provides access to a portion of the slide, which portion lies along the axis of pivoting thereof.

4. The device as claimed in claim 1, wherein the gearwheel comprises a drive housing for the rotational drive of the slide.

5. The device as claimed in claim 4, wherein the drive housing is defined by two longitudinal walls running parallel to a direction of translational movement of the slide.

6. The device as claimed in claim 5, wherein the gearwheel comprises a skirt in the continuation of the ring, the longitudinal walls being attached to the skirt.

7. The device as claimed in claim 1, wherein the tubular wall has a counterbore in which to mount the rolling bearing.

8. The device as claimed in claim 1, wherein the ring and the gearwheel are coaxial.

9. A valve comprising:
    a rotary actuator and a valve shutter which are joined together by a movement conversion device such that the actuator is able to close and open the valve shutter, wherein the movement conversion device converts a rotational movement of a gearwheel into a translational movement of a slide and comprises:
a support member equipped with a fixed tubular wall translationally connected to the slide by a camway, the gearwheel being mounted so that the gearwheel rotates on the support member, and wherein the gear wheel is connected in rotation to the slide which is able to pivot about an axis, wherein the gearwheel comprises a ring mounted to rotate on the support member by fitting the ring onto an internal ring of a rolling bearing, wherein an external ring of the rolling bearing is snugly fitted onto the tubular wall of the support member, and
wherein the valve shutter forms part of the slide.

10. The valve as claimed in claim 9, wherein the gearwheel has a central opening providing access to a portion of the slide, which portion lies along the axis along which a stem of the valve shutter extends.

11. The valve as claimed in claim 10, wherein the slide comprises the valve shutter and a bar fixed transversely to the stem of the valve shutter.

12. The valve as claimed in claim 11, wherein the stem of the valve shutter is fixed in a through-hole in the bar, and wherein the central opening provides direct access to the stem of the valve shutter.

13. The valve as claimed in claim 12, further comprising a sensor that senses the position of the valve shutter and is arranged in the central opening.

14. The valve as claimed in claim 13, further comprising a protective cap, the sensor being mounted on the interior face of the protective cap.

15. A device for converting a rotational movement of a gearwheel into a translational movement of a slide, the device comprising:
a support member equipped with a fixed tubular wall translationally connected to the slide by a camway, the gearwheel being mounted so that the gearwheel rotates on the support member, and wherein the gear wheel is connected in rotation to the slide which is able to pivot about an axis,
wherein the gearwheel comprises a ring mounted to rotate on a rolling bearing,
wherein the roller bearing is snugly fitted onto the support member, and
wherein the gearwheel comprises a toothed portion.

16. A device for converting a rotational movement of a gearwheel into a translational movement of a slide, the device comprising:
a support member equipped with a fixed tubular wall translationally connected to the slide by a camway, the gearwheel being mounted so that the gearwheel rotates on the support member, and wherein the gear wheel is connected in rotation to the slide which is able to pivot about an axis,
wherein the gearwheel comprises a ring mounted to rotate on a rolling bearing,
wherein the roller bearing is snugly fitted onto the support member, and
wherein the support member extends from only one side of the gearwheel and in the direction of the axis of rotation of the gearwheel.

* * * * *